United States Patent [19]

Anstötz et al.

[11] Patent Number: 5,751,271

[45] Date of Patent: May 12, 1998

[54] PROCESSOR SYSTEM COMPRISING A PROCESSOR AND A MEMORY FIELD FOR CONTAINING A COMPUTER INTERFACE

[75] Inventors: Karin Helene Maria Anstötz, Cologne, Germany; Karel Gerard Coolegem, The Hague, Netherlands

[73] Assignee: Koninklijke PTT Nederland N.V., Netherlands

[21] Appl. No.: 665,059

[22] Filed: May 15, 1996

Related U.S. Application Data

[63] Continuation of Ser. No. 269,049, Jun. 29, 1994, abandoned.

[30] Foreign Application Priority Data

Aug. 7, 1993 [EP] European Pat. Off. .............. 93202011

[51] Int. Cl.$^6$ ...................................................... G09G 5/08
[52] U.S. Cl. ........................... 345/146; 395/333; 395/337
[58] Field of Search ........................... 345/115, 116, 345/146, 163, 169, 173, 902; 395/326, 333–335, 337, 338, 343, 344, 345, 352, 354, 682; 370/465; 380/4

[56] References Cited

U.S. PATENT DOCUMENTS

| | | | |
|---|---|---|---|
| 4,931,783 | 6/1990 | Atkinson | 345/146 |
| 4,947,346 | 8/1990 | Kamiya | 364/521 |
| 4,951,249 | 8/1990 | McClung et al. | 380/4 |
| 5,038,401 | 8/1991 | Inotsume | 345/173 |
| 5,041,967 | 8/1991 | Ephrath et al. | 395/600 |
| 5,115,501 | 5/1992 | Kerr | 395/600 |
| 5,204,947 | 4/1993 | Bernstein et al. | 345/163 |
| 5,287,514 | 2/1994 | Gram | 395/700 |
| 5,355,452 | 10/1994 | Lam et al. | 395/200 |
| 5,384,910 | 1/1995 | Torres | 395/156 |
| 5,420,975 | 5/1995 | Blades et al. | 395/156 |

FOREIGN PATENT DOCUMENTS

| | | |
|---|---|---|
| 0464306 | 1/1992 | European Pat. Off. . |
| 0523661 | 1/1993 | European Pat. Off. . |

OTHER PUBLICATIONS

Microsoft Windows 3.1, Step by Step, Microsoft press p. 19, 1992.

Bier, E.A. et al., "MMM: A User Inteface Architecture for Shared Editors on a Single Screen", *Proceedings of the Fourth Annual Symposium* on User Interface Software and Technology, Nov. 11–13, 1991, Hilton Head, South Carolina, pp. 79–85.

*Primary Examiner*—Steven Saras
*Attorney, Agent, or Firm*—Michaelson & Wallace; Peter L. Michaelson; John C. Pokotylo

[57] ABSTRACT

Known processor systems comprising a processor and memory fields for implementing human-computer interfaces each having a number of elements each element representing a function are rather inflexible systems. The processor system according to the invention is a very flexible system, in that it receives a user code and generates an adjustable code which is allocated to an element and which depends upon the user code. This adjustable code can be a transmission code representing transmission information or can be a display code like an element code representing a display element being enabled or disabled or an element parameter representing a number of times a display element has been activated.

2 Claims, 5 Drawing Sheets

PROCESSOR SYSTEM COMPRISING A PROCESSOR AND A MEMORY FIELD FOR CONTAINING A COMPUTER INTERFACE

CROSS REFERENCE TO RELATED APPLICATION

This application is a continuation of patent application entitled "Processor System Comprising a Processor and a Memory Field for Implementing a Computer Interface Having A User-Adaptive Multi-Level Menu", Ser. No. 08/269,049, filed on Jun. 29, 1994 now abandoned.

BACKGROUND OF THE INVENTION

The invention relates to a processor system comprising a processor and a memory field for containing a computer interface having a number of elements each representing a function, the processor system being adapted for displaying at least one element on a screen.

Such processor systems are of common general knowledge, for example a Personal Computer (PC) or a workstation. The computer interface has a number of elements each representing a function, for example an icon (function: for example, file transfer), a menu bar (function: for example, menu item choice), a window (function: for example, editing of text or sharing computer application data), a video window (function: for example, display of image) or a number of required video windows (function: for example, required number of images to be displayed simultaneously). The processor system is adapted for displaying one or more elements directly on a screen, like four icons, one menu bar including menu-items and two video windows, and for displaying other elements indirectly or selectively on the screen, like two other icons and a pull-down-menu-item (these can be displayed, for example, by selecting a menu-item on the displayed menu bar). Other elements are never displayed on the screen, like the number of required video windows.

These known processor systems disadvantageously are rather inflexible systems.

SUMMARY OF THE INVENTION

It is an object of the invention, inter alia, to provide a flexible processor system.

Thereto, the processor system according to the invention is characterized in that the processor system is adapted for receiving a user code from a user, and generating at least one adjustable code in dependence of the user code, the adjustable code being allocated to an element.

A user code is sent by a user to the processor system, for example via a password or a smart card. In dependence on this user code an adjustable code is generated, for example by selecting a part of the user code or by converting a part of the user code into a converted part and defining this converted part as being the adjustable code, or by using the part of the user code for addressing a processor memory and reading out the adjustable code. This adjustable code is allocated to an element, which then becomes a user-dependent element. For example, for a first user an icon is displayed directly while for a second user the same icon is displayed indirectly. So, a very flexible processor system is created by making elements user-dependent, and the adjustability of the adjustable code allows a user to change the user-dependent element.

This invention is based on a first insight that all present processor systems comprising a processor and a memory field for containing a computer interface are rather inflexible systems as a consequence of the fact that the elements of the computer interface are not chosen differently for each user, and that at the hand of the received user code an adjustable code can be generated which is allocated to an element to supply this element of user-dependent information.

A first embodiment of this invention is characterized in that the processor system comprises a further memory field for containing a further computer interface having a further number of elements each representing a function, the processor system being adapted for selecting one of the memory fields in dependence on the user code.

By selecting between a memory containing a computer interface belonging to a user or a class of users and a memory containing a further computer interface belonging to a further user or a further class of users, a user can choose which computer interface he prefers at the hand of the user code.

A second embodiment of this invention is characterized in that the adjustable code comprises a transmission code being allocated to a transmission element representing a transmission function.

Such a transmission element is for example a required bit-rate for transmission.

A third embodiment of this invention is characterized in that the processor system is adapted for storing a new value of the transmission code at a memory location which is associated with the user code.

By storing a new value of a transmission code a user, after the application to which the computer interface belongs is switched off and on, gets a computer interface according to the latest status.

A fourth embodiment of this invention is characterized in that the adjustable code comprises a display code being allocated to a display element representing a display function, this display code being an element code representing this display element being enabled or disabled, the processor system being adapted for displaying or not displaying this display element on a screen in dependence of the element code.

A user being allowed to activate enabled elements cannot activate only disabled elements. These are not displayed or are displayed in another way showing the disablement.

A fifth embodiment of this invention is characterized in that the processor system is adapted for storing a new value of the element code at a memory location which is associated with the user code.

By storing a new value of an element code a user, after the application to which the computer interface belongs is switched off and on, gets a computer interface according to the latest status.

A sixth embodiment of this invention is characterized in that the adjustable code comprises a display code being allocated to a display element representing a display function, this display code being an element parameter being a function of a number of times that this display element has been activated, the processor system being adapted for comparing this element parameter with a predefined value and in dependence of a comparison result directly or indirectly displaying this display element on a screen.

Such a processor system is flexible as well as dynamic, the number of times a display element has been activated determining whether this display element is displayed directly or indirectly.

A seventh embodiment of this invention is characterized in that the processor system is adapted for storing a new value of the element parameter at a memory location which is associated with the user code.

By storing a new value of an element parameter a user, after the application to which the computer interface belongs is switched off and on, gets a computer interface according to the latest status.

Of course, two or more of the mentioned embodiments can be combined in all possible ways.

BRIEF DESCRIPTION OF THE DRAWINGS

The invention will be explained in detail at the hand of embodiments shown in the figures.

DETAILED DESCRIPTION

Figure 1:
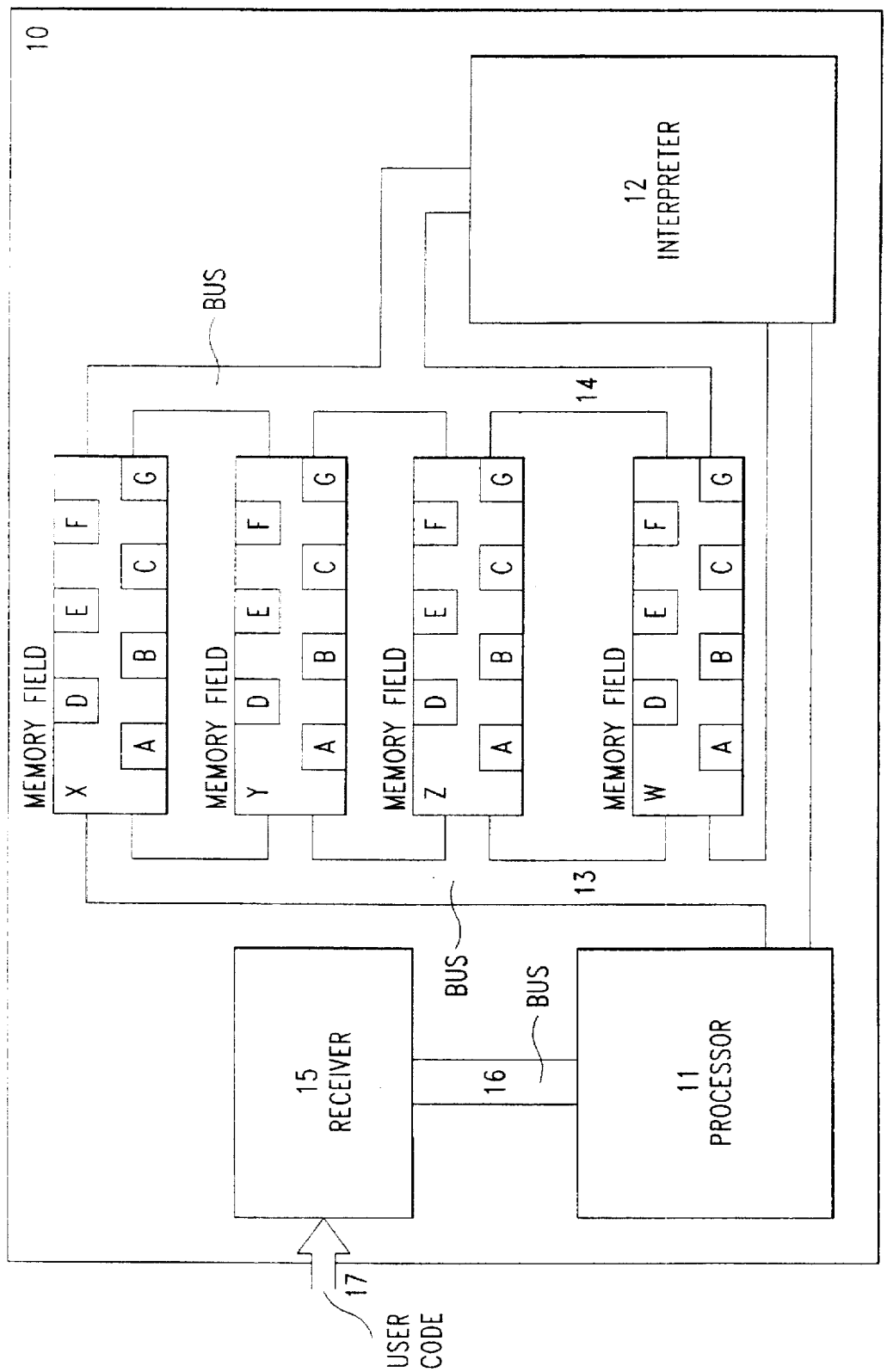
FIG. 1 shows a processor system according to the invention comprising four memory fields for containing computer interfaces.

In FIG. 1 processor system 10 comprises a processor 11, an interpreter 12, four memory fields X, Y, Z and W. Via a bus 13 processor 11 is connected with interpreter 12 and with the memory fields X, Y, Z and W, and via a bus 14 memory fields X, Y, Z and W are connected with interpreter 12. Processor system 10 further comprises a receiver 15 for receiving a user code 17, which receiver 15 is coupled via a bus 16 with processor 11. Receiver 15 could be a keyboard, in which case user code 17 is a password, or could be a smart card reader, in which case user code 17 is stored on a smart card. A memory field X, Y, Z or W contains a computer interface having according to this embodiment seven elements A, B, C, D, E, F and G, each one of these elements representing a different function. At least one of these elements is a display element and can be displayed directly on a screen, for example an icon which is activated by a mouse. Other display elements can only be displayed indirectly, for example via a menu-item on a displayed menu bar via which these display elements are to be selected using a mouse. Further elements cannot be displayed at all, for example transmission elements.

Figure 2:
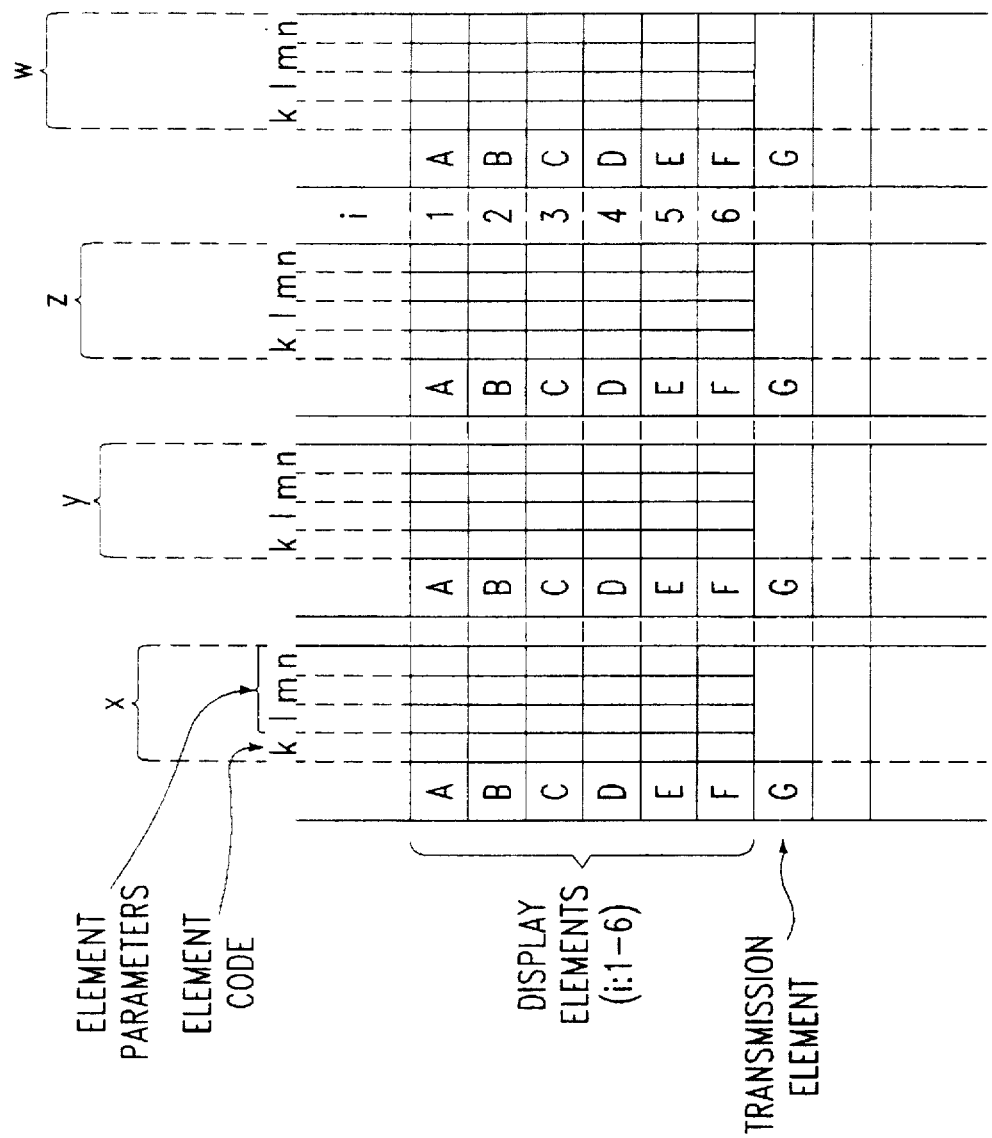
FIG. 2 shows a representation of the four memory fields, each one of them comprising an element code and element parameters belonging to an element of a computer interface.

In FIG. 2, four memory fields X, Y, Z and W are represented. A computer interface comprises, according to this embodiment, seven elements: six display elements A (row i=1), B (row i=2), C (row i=3), D (row i=4), E (row i=5) and F (row i=6) and one transmission element G. To each display element A, B, C, D, E or F an element code (column k) and three element parameters (columns l, m and n) are allocated. An element code $X_{i,k}$, $Y_{i,k}$, $Z_{i,k}$ and $W_{i,k}$ represents this display element being enabled or disabled, and an element parameter $X_{i,1}$, $Y_{i,1}$, $Z_{i,1}$ and $W_{i,1}$ represents this display element being displayed directly or indirectly. An element parameter $X_{i,m}$, $Y_{i,m}$, $Z_{i,m}$ and $W_{i,m}$ represents a number of lines for example per time interval this display element has been activated, and an element parameter $X_{i,n}$, $Y_{i,n}$, $Z_{i,n}$ and $W_{i,n}$ represents a previous number of times for example per time interval this display element has been activated. Of course, further element codes and element parameters are possible. In dependence on a received user code, at least one adjustable code is generated, which is allocated to an element. This adjustable code could be the element code, one of the element parameters, or a combination of one or more of the element parameters and the element code. According to another embodiment this adjustable code represents the element code, one of the element parameters, or a combination of one or more of the element parameters and the element code, for example by being an adjustable pointer to a memory in which element codes and element parameters are stored.

Figure 3A:
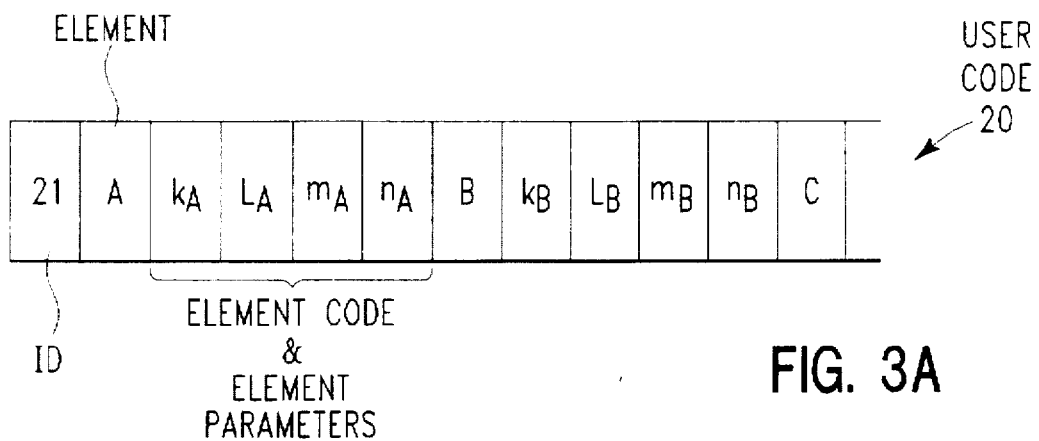
FIG. 3 shows possible embodiments of user codes in FIGS. 3A, 3B and 3C collectively for a processor system according to the invention.

In FIG. 3A, user code 20 comprises an identification (ID) section 21 for identifying a user and/or defining a user cluster, five sections with respect to element A and its element code and element parameters, five sections with respect to element B and its element code and element parameters, etc. Each section comprises a number of bits or one or more bytes, for example. Such a user code 20 could be stored on a smart card or somewhere else or could be derived from a password.

Figure 3B:
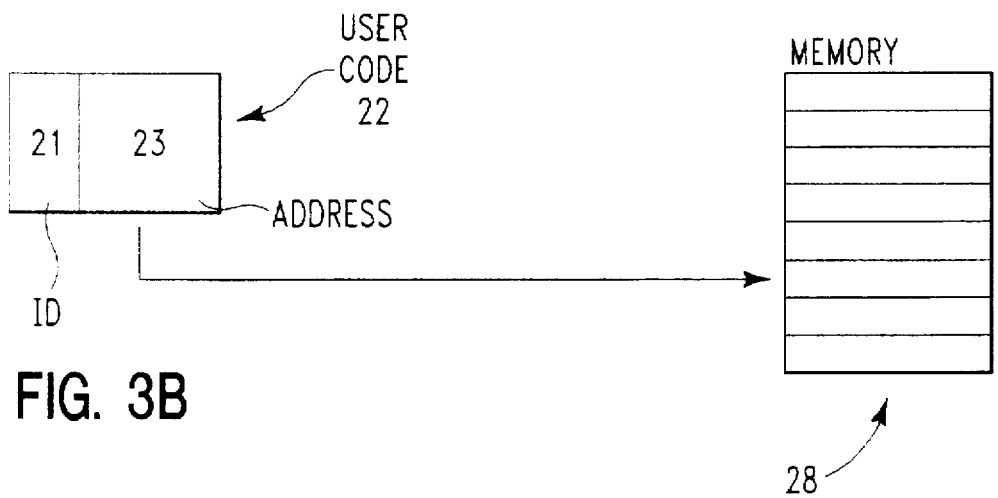

In FIG. 3B, all sections of user code 20 apart from identification section 21 are stored in part of processor memory 28, which is addressed at the hand of user code 22, which comprises identification section 21 and address section 23. Such a user code 22 could be stored on a smart card or somewhere else or could be derived from a password. In fact, the smallest possible user code only comprises an address section.

Figure 3C:
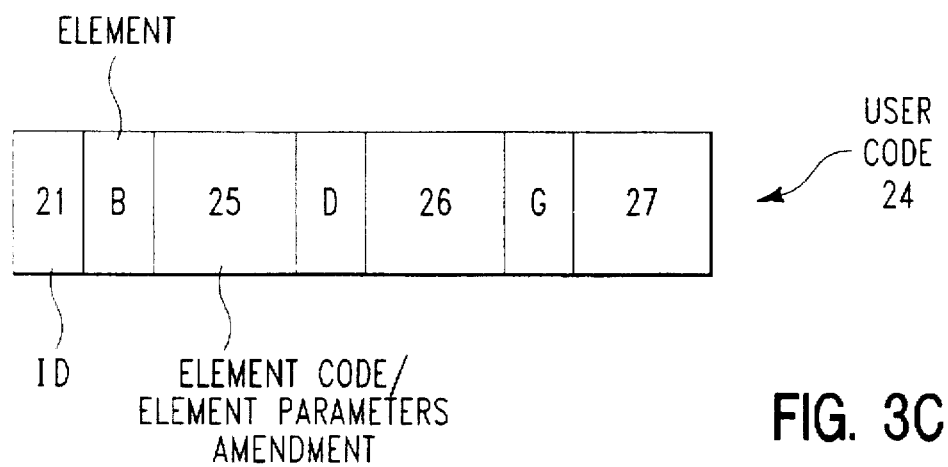

In FIG. 3C, user code 24 comprises identification section 21 and six sections with respect to amendments which are to be made to for example, a memory field, associated with the user code, comprising element codes and/or element parameters. According to this embodiment, an amendment is to be made to an element code and/or element parameters of element B at the hand of section 25, an amendment is to be made to an element code and/or element parameters of element D at the hand of section 26 and an amendment is to be made to a function of element G at the hand of section 27. Such a user code 24 could be stored on a smart card or somewhere else or could be derived from a password. Furthermore, it is possible according to another user code to store the six sections in another processor memory adapted for storing (in association with the other user code) amendments only, and to address this other processor memory at the hand of this other user code.

A user code can also be more complicated like an executable file, for example, a user profile.

After adaptation or adjustment, new values of transmission codes, element codes and/or element parameters and/or amendments only thereto can be stored at a memory location, for example on a smart card (in which case they are automatically associated with the user code), or in a part of processor memory 28 or another processor memory adapted for storing amendments only (in which cases their location in these memories should be associated to the user code).

Figure 4:
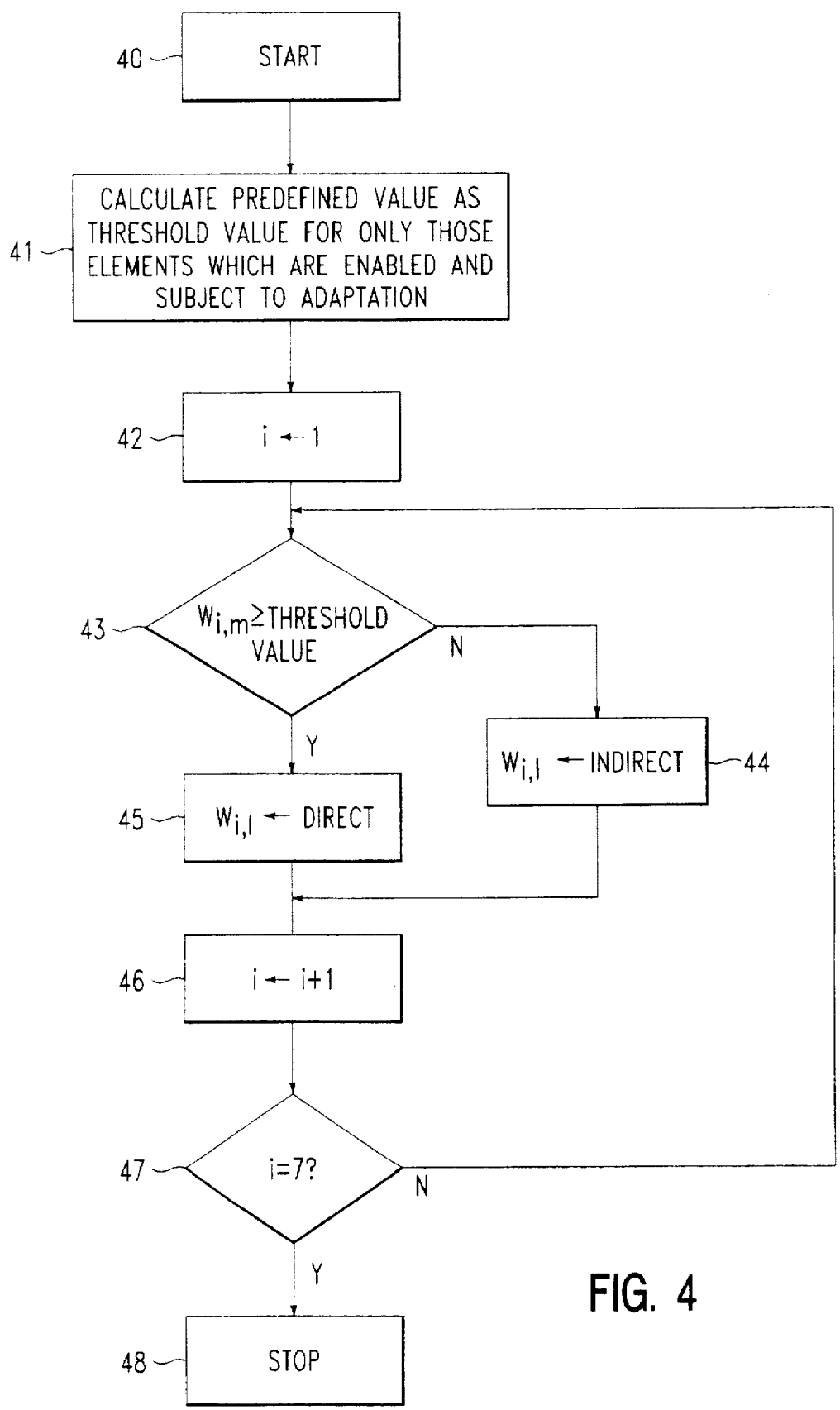
FIG. 4 shows a flow chart of adapting an adaptable computer interface in an adaptable memory field.

In FIG. 4 blocks of the flow chart have the following meaning:

| block | meaning |
|---|---|
| 40 | start |
| 41 | calculate predefined value as threshold value for only those elements which are enabled and subject to adaptation |
| 42 | i ← 1 |
| 43 | $W_{i,m} \geq$ threshold value ? |

| block | meaning |
|---|---|
|  | if yes : to block 45 |
|  | if no : to block 44 |
| 44 | $W_{i,1} \leftarrow$ Indirect |
| 45 | $W_{i,1} \leftarrow$ Direct |
| 46 | $i \leftarrow i + 1$ |
| 47 | $i = 7$ ? |
|  | if yes : to block 48 |
|  | if no : to block 43 |
| 4 8 | stop |

According to the flow chart of FIG. 4, after the adapting has started (block 40), a predefined value further to be called a "threshold" value is calculated (block 41), but only for those elements which are enabled and subject to adaptation (transmission element G in FIG. 2 is not to be adapted). There are several possibilities to do this, for example:

- comparing the number of times an enabled element has been activated with the number of times another enabled element has been activated for each possible combination of enabled elements, and at the hand of the comparison results selecting a certain borderline as a threshold;
- calculating an average of several previous numbers of times enabled elements have been activated and selecting the average as a threshold;
- adding an element-dependent number to a previous number of times an enabled element has been activated and selecting the sum as an element-dependent threshold;
- calculating an average of a present and one or more previous thresholds.

Then i gets the value 1 (block 42) and the number of times an element has been activated $W_{i,m}$ is compared with the calculated threshold (block 43), which causes this element to be displayed directly (block 45) or indirectly (block 44). Subsequently, i is increased by the value 1 (block 46) and the next number of times an element has been activated is compared with the calculated threshold (block 43 etc.) until i gets the value 7 (block 47). Once all six elements $W_{i,j}$ have been determined, the adapting stops (block 48).

While some thresholds, like the one being a selected borderline, will lead to a number of elements to be displayed directly being equal to a maximum number of elements that can be displayed directly, other thresholds, like the one being a sum of an element-dependent number and a previous number, could lead to a larger or smaller number than the maximum number. In case of a larger number, a next selection should be made to decrease the larger number, for example at the hand of a new borderline which is defined for elements belonging to the larger number only. In case of a smaller number, this should be increased, for example at the hand of a new borderline which is defined for only those elements not belonging to the smaller number.

To adapt a computer interface, there are several possibilities:

- the content of a memory field X, Y, Z or W remains in the same memory field while adapting;
- the content of a memory field X, Y or Z is placed into the memory field W for the adapting;
- the content of a memory field X, Y, Z or W is placed into another memory not shown in FIG. 1, for example a processor memory, for the adapting.

Figure 5A:
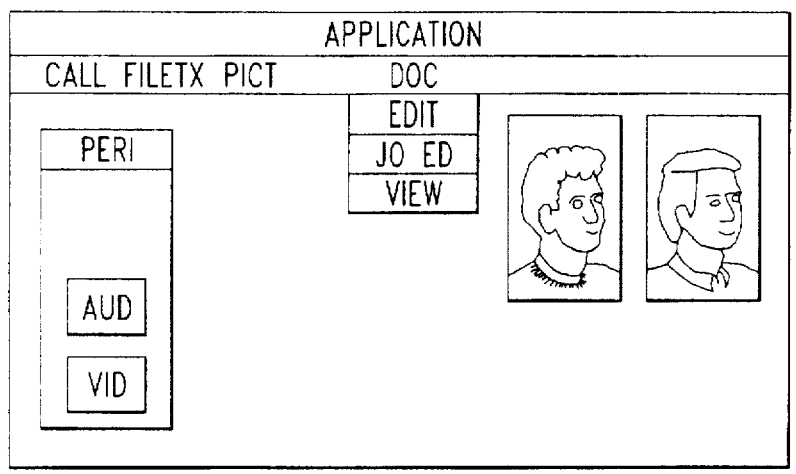
FIG. 5 shows three possible screen layouts in FIG. 5A, 5B and 5C collectively for a processor system according to the invention.

The screen layout of a conference application in FIG. 5A belonging to a first user having a first user code shows a directly displayed element "window" containing a directly displayed element "menu bar" comprising elements "menu-items" like CALL (set up connection), FILETX (select & transmit file), PICT (select, view & transmit selected picture) and DOC (local editing &r view selected document), which all are also displayed directly. Further, an element "window" PERI (select peripheral) is shown comprising a directly displayed element "icon" AUD (select audio) and a directly displayed element "icon" VID (select video). The element "menu-item" DOC has been activated, and its pull down menu is shown comprising "pull-down-menu-items" EDIT (local editing selected document) and VIEW (view selected document). Since the elements "pull-down-menu-item" are displayed only after activation of element "menu-item" DOC, these elements are displayed indirectly. The other elements "menu-item" CALL, FILETX and PICT are not activated, but could also be activated. The elements "icon" AUD and VID are not activated, but could be activated. If, for example, the element "icon" AUD would have been activated, then, as a result an element "window" AUDIO (not shown) would have been shown comprising elements "icon" loudspeaker, AUD MU (audio muting) and QU (quit for closing element "window" AUDIO). Since the element "window" AUDIO will be displayed only after activation of the element "icon" AUD, the element "window" AUDIO (and its elements "icon") is displayed indirectly. Two further elements "video windows" showing other conferees are also directly displayed in this screen layout.

Figure 5B:
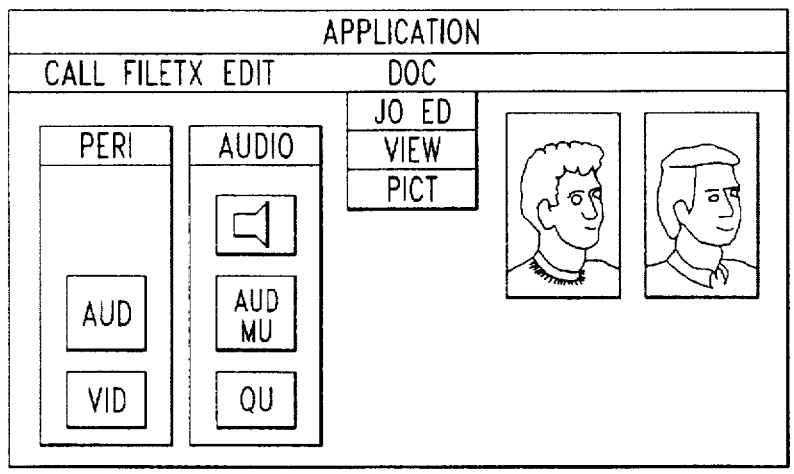

The screen layout of a conference application in FIG. 5B belonging to a second user having a second user code shows a directly displayed element "window" containing a directly displayed element "menu bar" comprising elements "menu-items" like CALL (set up connection), FILETX (select & transmit file), EDIT (local editing) and DOC (when activated: joint editing & view selected document & select, view and transmit selected picture), which all are also displayed directly. Further an element "window" PERI (select peripheral) is shown comprising a directly displayed element "icon" AUD (select audio) and a directly displayed element "icon" VID (select video). Element "menu-item" DOC has been activated, and its pull down menu is shown comprising "pull-down-menu-items" JO ED (joint editing selected document), VIEW (view selected document) and PICT (select, view & transmit selected picture). Since the elements "pull-down-menu-item" are displayed only after activation of the element "menu-item" DOC, these elements are displayed indirectly. The other elements "menu-item" CALL, FILETX and EDIT are not activated, but could also be activated. The elements "icon" AUD and VID are not activated, but could be activated. If, for example, the element "icon" AUD would have been activated, then, as a result an element "window" AUDIO (not shown) would have been shown comprising elements "icon" loudspeaker, AUD MU (audio muting) and QU (quit for closing element "window" AUDIO). Since the element "window" AUDIO will be displayed only after activation of the element "icon" AUD, the element "window" AUDIO (and its elements "icon") is displayed indirectly. Two further elements "video windows" showing other conferees are also directly displayed in this screen layout.

Figure 5C:
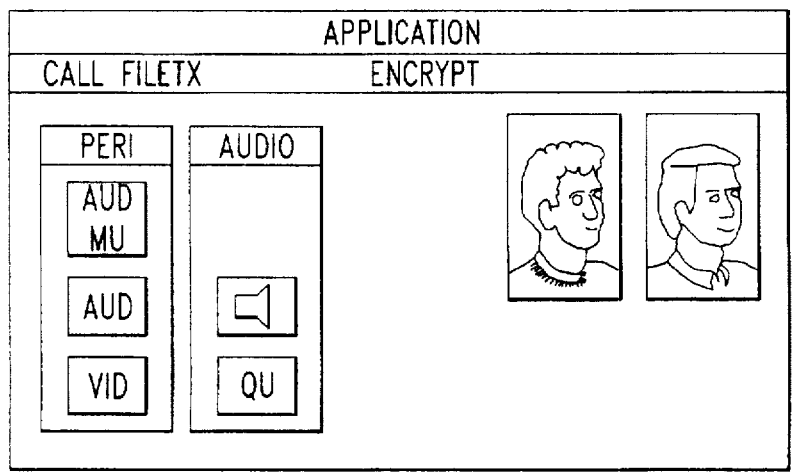

The screen layout of a conference application in FIG. 5C belonging to a third user having a third user code shows a directly displayed element "window" containing a directly displayed element "menu bar" comprising elements "menu-items" like CALL (set up connection), FILETX (select & transmit file) and ENCRYPT (encryption of selected file), which all are also displayed directly. Further, an element "window" PERI (select peripheral) is shown comprising a directly displayed element "icon" AUD (select audio), a directly displayed element "icon" VID (select video) and a directly displayed element "icon" AUD MU (audio muting). The elements "menu-item" CALL, FILETX and ENCRYPT are not activated, but could be activated. The elements "icon" AUD and VID are not activated, but could also be activated. If for example the element "icon" AUD would have been activated, then, as a result an element "window" AUDIO (not shown) would have been shown comprising elements "icon" loudspeaker and QU (quit for closing element "window" AUDIO). Since the element "window" AUDIO will be displayed only after activation of the element "icon" AUD, the element "window" AUDIO (and its elements "icon") is displayed indirectly. Three further elements "video windows" showing other conferees are also directly displayed in this screen layout.

For each one of the three users, as collectively shown in FIGS. 5A, 5B and 5C, the elements "menu-item" CALL and FILETX are displayed directly, which means they can be activated immediately. For the first and second users the element "menu-item" DOC is displayed directly and has been activated by them: the first user gets the elements "pull-down-menu-item" EDIT and VIEW, while the second user gets the elements "pull-down-menu-item" JO ED, VIEW and PICT. For the third user, the element "menu-item" ENCRYPT is displayed directly, which means that it can be activated directly. This element "menu-item" ENCRYPT is not enabled for the other two users.

For the first and second users the element "window" PERI is shown comprising a directly displayed element "icon" AUD and a directly displayed element "icon" VID, which can be activated immediately. The element "window" PERI belonging to the third user comprises a directly displayed element "icon" AUD and a directly displayed element "icon" VID as well as a directly displayed element "icon" AUD MU, which all can be activated immediately.

For the first and second users, only two elements "video windows" showing other conferees are directly displayed, while for the third user three elements "video windows" showing other conferees are directly displayed.

Summarizing, because of the different user codes, the third user gets three elements "video windows", while the first and second users only get two elements "video windows". So the third user can see three other conferees, while the first and second users can see two other conferees. Only the third user gets the element "menu-item" ENCRYPT, while only the first and second users get the element "menu-item" DOC. So only the third user can encrypt his files, and only the first and second users can edit documents. Both first and second users, get the element "pull-down-menu-item" VIEW to view documents via a pull-down-menu, while only the first user gets the element "pull-down-menu-item" EDIT and only the second user gets the elements "pull-down-menu-item" JO ED and PICT. So the first user can edit his document locally via a pull-down-menu, but not jointly, while the second user can edit his document jointly with others and select, view and transmit pictures via a pull-down-menu. The element "menu-item" PICT is displayed directly for the first user only, whereas the elements "menu-item" EDIT is displayed directly for the second user only. So the first user can select, view and transmit pictures immediately, while the second user can edit documents immediately. All users get the elements "icon" AUD and VID and can therefore select audio and video immediately, while only the third user gets the element icon" AUD MU, so only he can mute the audio signal immediately, the other two users can do this after activation of the element "icon" AUD.

According to FIG. 2 and FIG. 5A, the element codes and element parameters allocated to the display elements could be as follows (transmission elements are not included in this table):

| element | k | l | m | n |
|---|---|---|---|---|
| menu bar | E | D | — | — |
| CALL | E | D | 7 | 8 |
| FILETX | E | D | 6 | 9 |
| PICT | E | D | 4 | 5 |
| DOC | E | D | 4 | 6 |
| EDIT | E | I | 3 | 4 |
| JO ED | D | I | — | — |
| VIEW | E | I | 1 | 2 |
| PERI | E | D | — | — |
| AUD | E | D | 6 | 3 |
| VID | E | D | 5 | 4 |
| AUD MU | E | I | 2 | 3 |
| loudspeaker | E | I | 2 | 3 |
| QU | E | I | — | — |
| number of required video windows | E | D | — | — |

According to this table, all elements but the element "pull-down-menu-item" JO ED are enabled (column k), which means that they are displayed either directly or indirectly (column l). The element "pull-down-menu-item" JO ED is disabled and therefore not shown at all or according to another embodiment shown together with an indication showing the disablement. Further, the number of times (column m) they have been activated, for example during an hour, and the previous number of times (column n) they have been activated, for example during a previous hour, is shown, except for the elements menu bar and PERI, which are always shown directly, and except for the element JO ED which is disabled.

As can be derived from column m, the directly displayed element "menu-item" PICT (E,D,4,5) has been activated 4 times per time interval and the indirectly displayed element "pull-down-menu-item" EDIT (E,I,3,4) has been activated 3 times per time interval. If during a next time interval the element PICT is activated 4 times and the element EDIT is activated 5 times, then the element PICT will be displayed indirectly (as a pull-down-menu-item element: E,I,4,4) and the element EDIT will be displayed directly (as a menu-item element: E,D,5,3).

As can be derived from column m, the indirectly displayed element "icon" AUD MU (E,I,2,3) has been activated 2 times per time interval, which number of times is smaller than a certain threshold, for example 4 times per time interval. If during a next time interval the element AUD MU is activated 5 times, which number of times is larger than the certain threshold of 4 times per time interval, then the element AUD MU will be displayed directly (as a directly displayed element "icon": E,D,5,2).

Of course, measures should be taken to allocate an element type ("menu bar", "menu-item", "pull-down-menu-item", "window", "icon" etc.) to each element in the table. This could be realized by allocating a certain element type to each row of the shown table (for example, the first row always being a "menu bar" row, the second and third row always being "menu-item" rows, etc.), in which case sometimes it will be necessary to interchange some elements after adaptation. It could also be realized by adding an extra column to the shown table for indicating the element type.

For transmission elements it may be necessary to define other columns, comprising transmission codes, in the table, for example for the transmission element "bit-rate": the transmission codes "enabled/disabled" and value "64000" meaning an allowed transmission bit-rate of 64 kbit/sec.

The entire contents of the table could be stored on a smart card of the first user being a part of the first user code (in which case a memory field is filled with this contents during activation of the application), or could be stored in a processor memory (FIG. 3B) which is addressable at the hand of the first user code, or could be stored in a memory field (FIG. 2) which is selectable at the hand of the first user code. It is also possible that a basic content is stored in a memory field (which is selectable at the hand of the first user code) or a processor memory (which is addressable at the hand of the first user code) and that an amendment content (which together with the basic content forms the content of the table) is stored on the smart card or in another memory field (which is selectable at the hand of the first user code) or in another (processor) memory (which is addressable at the hand of the first user code).

According to FIG. 2 and FIG. 5B, and FIG. 2 and FIG. 5C other tables comprising other contents will be definable for the second and the third users.

We claim:

1. A processor system comprising a processor and a memory field for implementing a computer interface, the interface having a plurality of display elements, each of the display elements representing a function, a first display element in the plurality of display elements being directly displayed on a screen in response to a first adjustable element code being allocated to this first display element and having a first value, the first display element being directly displayed on the screen in case the first display element is to be displayed continuously during a length of time and independent of whether or not the first display element has been activated, and a second display element in the plurality of display elements being selectively displayed on a screen in response to a second adjustable element code being allocated to this second display element and having a second value, the second display element being selectively displayed on the screen in case the second display element is not to be displayed continuously during the length of time but is to be continuously displayed only after the second display element has been activated, the processor system being adapted for:

receiving a user code from a user, generating a plurality of adjustable element codes in response to the user code wherein one of the plurality of adjustable element codes has the first value and is allocated to the first display element and another one of the plurality of adjustable element codes has the second value and is allocated to the second display element, generating further element codes in response to the user code, each one of the further element codes being allocated to a corresponding one of the plurality of the display elements and having a value representing whether the corresponding one display element is enabled or disabled, and displaying or not displaying individual ones of the plurality of display elements on the screen in response to values of the corresponding individual ones of the further element codes, generating one of a plurality of additional element codes in response to the user code, the one of the plurality of additional element codes being allocated to a transmission element and setting an attribute of a transmission function to be performed by the processor system, and storing in a memory location associated with the user code and within a memory associated with the processor system, a new value for one of a group consisting of the adjustable element codes, the further element codes and the additional element for subsequent use in controlling display of an associated one of the display elements or setting the attribute of the transmission function.

2. The processor system according to claim 1 and being adapted for generating a plurality of adjustable element code parameters, each one of the adjustable element code parameters being allocated to a corresponding one of the plurality of the display elements and being a function of the number of occurrences that the corresponding one of the plurality of the display elements has been activated by said user, comparing the adjustable element parameter with a predefined value so as to provide a comparison result, and allocating, in response to the comparison result, the first value or the second value to an adjustable element code being allocated to the corresponding one of the plurality of the display elements such that said corresponding one of the plurality of display elements is to be directly or selectively displayed on the screen.

* * * * *

UNITED STATES PATENT AND TRADEMARK OFFICE
CERTIFICATE OF CORRECTION

| | | |
|---|---|---|
| PATENT NO. | : 5,751,271 | Page 1 of 1 |
| APPLICATION NO. | : 08/665059 | |
| DATED | : May 12, 1998 | |
| INVENTOR(S) | : Karin Helene Maria Anstöz and Karel Gerard Coolegem | |

It is certified that error appears in the above-identified patent and that said Letters Patent is hereby corrected as shown below:

On the Title Page, in the "Foreign Application Priority Data" item [30], delete "Aug. 7, 1993", and replace with -- Jul. 8, 1993 --.

Signed and Sealed this
Twenty-second Day of May, 2012

David J. Kappos
*Director of the United States Patent and Trademark Office*